(12) United States Patent
Van Buskirk et al.

(10) Patent No.: US 8,650,096 B2
(45) Date of Patent: Feb. 11, 2014

(54) VIRTUAL WORLDS SEAMLESS OBJECT DROP INTEGRATION

(75) Inventors: Ronald E. Van Buskirk, Boulder, CO (US); David L. Wright, Folsom, CA (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 12/756,505

(22) Filed: Apr. 8, 2010

(65) Prior Publication Data

US 2011/0251928 A1 Oct. 13, 2011

(51) Int. Cl.
*G06Q 30/00* (2012.01)
(52) U.S. Cl.
USPC .......................... 705/27.2; 705/26.1; 705/27.1
(58) Field of Classification Search
USPC .................................................. 705/26–27.2
See application file for complete search history.

(56) References Cited

U.S. PATENT DOCUMENTS

| 7,342,587 | B2 * | 3/2008 | Danzig et al. ................. 345/473 |
| 7,353,188 | B2 | 4/2008 | Yim et al. |
| 7,484,176 | B2 | 1/2009 | Blattner et al. |
| 2008/0249897 | A1 * | 10/2008 | Oh et al. ......................... 705/27 |
| 2009/0043674 | A1 * | 2/2009 | Minsky et al. .................. 705/27 |

OTHER PUBLICATIONS

Weber, J. (Oct. 27, 1996). Download This: The Dirty Secret About the Net; Hint: It's About Money (But Isn't It Always?). Los Angeles Times (Pre-1997 Fulltext).*
Shyayn Lusch, Shag—Fabulous Furniture for Fabulous Virtual Living, Jan. 16, 2009; http://shaginsl.blogspot.com/.
Chris Harding, Elissa Dubinsky, Virtual Worlds—Instructions to Use Second Life, Apr. 7, 2008; https://www.opengroup.org/sophocles/show_mail.tpl?CALLER=show_archive.tpl&source=L&listname=udef&id=1037.
Vlad Constandes, Yahoo! IM Avatar Shopping? Bring It!, Nov. 13, 2007, Published on: Nov. 13, 2007 Source: http://news.softpedia.com/news/Yahoo-IM-Avatar-Shopping-Bring-it-70682.shtml.

* cited by examiner

*Primary Examiner* — Resha Desai

(57) ABSTRACT

Virtual worlds seamless object drop integration enables users to obtain products in a virtual world by dragging a product image icon off of an e-commerce web page and on to a virtual world client. The drag-and-drop movement is initiated by the user from a browser window on a display screen. The browser calls an underlying system service to pass an image tag corresponding to the product image icon on to the virtual world client. The image tag includes a unique identifier. The virtual world client checks the image tag to see if the corresponding product has a price, and asks the user if they want to buy it. A product purchase transaction is completed by a virtual world network server and a payments network server that is called in for the financial authorizations. The seller's web page and payments network server are addressed by their respective Uniform Resource Locator (URL).

18 Claims, 2 Drawing Sheets

VIRTUAL WORLDS SEAMLESS OBJECT DROP INTEGRATION

BACKGROUND OF THE INVENTION

1. Field of the Invention

The present invention relates to interoperable web sites and e-commerce on computer networks, and more particularly to methods and devices that allow a user to drag items from web pages displayed in browser windows and to drop the items in the application window of a virtual world, where the drag and drop action is a metaphor for the user's purchase or acquisition of the item represented by an image icon.

2. Background Information

Virtual shopping environments currently exist on the Internet. Examples of virtual shopping environments include e-commerce web sites where users/purchasers and sellers buy and sell a broad variety of goods and services worldwide. Users navigate the Internet to different e-commerce web sites using network browsers and search through the virtual inventory of the web site to find what they want to buy or learn more about. Many sellers do not actually have the items being auctioned or offered for sale in stock. In any event, the transactions are concluded by linking to a money transfer or payment web site or private checkout system. Real money is then charged to the user/purchaser and real products are then physically delivered.

Virtual worlds are a genre of online community that often take the form of a computer-based simulated environment, through which users can interact with one another and use and create objects. Virtual worlds are intended for their users to inhabit and interact and have become synonymous with interactive 3D virtual environments, where the users take the form of avatars visible to others graphically. These avatars are usually depicted as textual, two-dimensional, or three-dimensional graphical representations, although other forms are possible. Most virtual worlds allow for multiple users.

One such virtual world is "Second Life". Second Life is a virtual world developed by Linden Lab of San Francisco, Calif. (www.lindenlab.com) that launched in June 2003 and is accessible via the Internet. Second Life enables its users, called Residents, to interact with each other through avatars. Residents can explore, meet other residents, socialize, participate in individual and group activities, and create and trade virtual property and services with one another, or travel throughout the world (referred to as "the grid").

In this virtual world, users virtually navigate around the world and have the ability to find and purchase virtual goods that can be added to their avatar's inventory. Examples of items that can be bought are clothes to dress the avatar, furnishings for the avatar's virtual home or business, and cars. Attractive new bodies can also be purchased for a price. Virtual money, such as Linden Dollars ($L), is used to buy the virtual goods. No actual or tangible thing is physically delivered. However, if a user has not earned and banked enough virtual money in the virtual world, the user can buy in, like chips in a poker game, using real money. Again, PayPal is a common way to buy virtual money like Linden dollars.

In 2008, IBM (International Business Machines Corporation, of Armonk, N.Y.) and Linden Lab, which operates Second Life, demonstrated virtual world interoperability by teleporting avatars between Second Life and an entirely different Metaverse running on an OpenSim network server. A Metaverse is a virtual world, where humans, as avatars, interact with each other and software agents, in a three-dimensional space that uses the metaphor of the real world. The term "Metaverse" is most typically used to describe a virtual reality-based, 3D successor to the Internet.

This demonstration was a significant development, because it showed online virtual worlds could stop operating as closed environments and let avatars travel between metaverses. That requires a high level of interoperability between not only the respective virtual world servers, but also the user operating system displaying the respective virtual worlds in their corresponding display windows.

As of the beginning of 2010, there is a scarcity of standards for interoperability amongst competing virtual worlds. Additionally, the many e-commerce web sites do not have the ability to interoperate with other e-commerce web sites and servers, except payment facilitators. However, e-commerce web sites desire the ability to interoperate with other e-commerce web sites and servers and are beginning to effectuate these changes.

For example, Google (Google Inc.; an Internet search engine) has developed an operating system for a mobile telephone with T-Mobile (a mobile telephone provider, owned by Deutsche Telekom). An operating system developed by Google, known as the "Android" operating system found on T-Mobile's "G1 Smartphone" mobile telephone, allows users to jump between "Google Maps", "G-Mail", and other Google servers.

SUMMARY OF THE INVENTION

The foregoing problems are solved and an advance in the art is obtained by a novel method and apparatus for virtual worlds' seamless object drop integration. The invention provides an easy and intuitive method and machine automation enables users to buy products in a virtual world that is as simple as dragging a product image icon off of an e-commerce web page and on to a virtual world client.

In one general embodiment, a machine automation for enabling users to acquire products by dragging a product image icon off of an e-commerce web page and on to a virtual world client comprises at least one product image icon disposed in seller web page for display in a browser window and representing a product that is offered for a buyer from a seller; an image tag associated with each product image icon and including information related to a unique identifier, e.g., stock keeping unit (SKU) or universal product code (UPC), buyer credentials, and seller information; a virtual world client providing for a virtual world window to be presented on a user display screen together with the browser window; and a drag-and-drop application program for interpreting a user action that drags product image icons from the browser window on to a virtual world client window as a request to obtain corresponding products, and for passing the respective image tags to an underlying operation system in communication with a network and a virtual world network server. Wherein, the virtual world network server is configured to receive the respective image tags and graphically render the products they represent in a virtual world occupied by an avatar controlled by the buyer.

In another general embodiment, a method for using a computer to obtain products by dragging a product image icon off of an e-commerce web page and on to a virtual world client comprises displaying at least one product image icon in seller web page in a browser window to represent a virtual or real product that is offered for sale to a buyer from a seller; associating an image tag with each product image icon and including information related to a unique identifier, such as stock keeping unit (SKU) or universal product code (UPC), buyer credentials, and seller identification; using a virtual world client to provide a virtual world window on a user display screen together with the browser window; and interpreting a user action with a drag-and-drop application program that drags product image icons from the browser window on to a virtual world client window as a request to obtain the corresponding virtual or real products, and for passing the respective image tags to an underlying operation system in communication with a network and a virtual world network server. Wherein, the virtual world network server can receive the respective image tags and graphically render the products they represent in a virtual world occupied by an avatar controlled by the buyer.

In another general embodiment, a computer program product comprises a computer usable medium having computer usable program code embodied therewith, the computer usable program code configured to obtain products by dragging a product image icon off of an e-commerce web page and on to a virtual world client. The computer usable program code comprises computer usable program code configured to display at least one product image icon in seller web page in a browser window to represent a virtual or real product that is offered for sale to a buyer from a seller; computer usable program code configured to associate an image tag with each product image icon and include information related to a unique identifier, such as a stock keeping unit (SKU) or universal product code (UPC), buyer credentials, and seller identification; computer usable program code configured to use a virtual world client to provide a virtual world window on a user display screen together with the browser window; and computer usable program code configured to interpret a user action with a drag-and-drop application program that drags product image icons from the browser window on to a virtual world client window as a request to obtain corresponding virtual or real products, and for passing the respective image tags to an underlying operation system in communication with a network and a virtual world network server. Wherein, the virtual world network server can receive the respective image tags and graphically render the products they represent in a virtual world occupied by an avatar controlled by the buyer.

Other aspects and advantages of the present invention will become apparent from the following detailed description, which, when taken in conjunction with the drawings, illustrate by way of example the principles of the invention.

DESCRIPTION OF THE PREFERRED EMBODIMENTS

Figure 1:
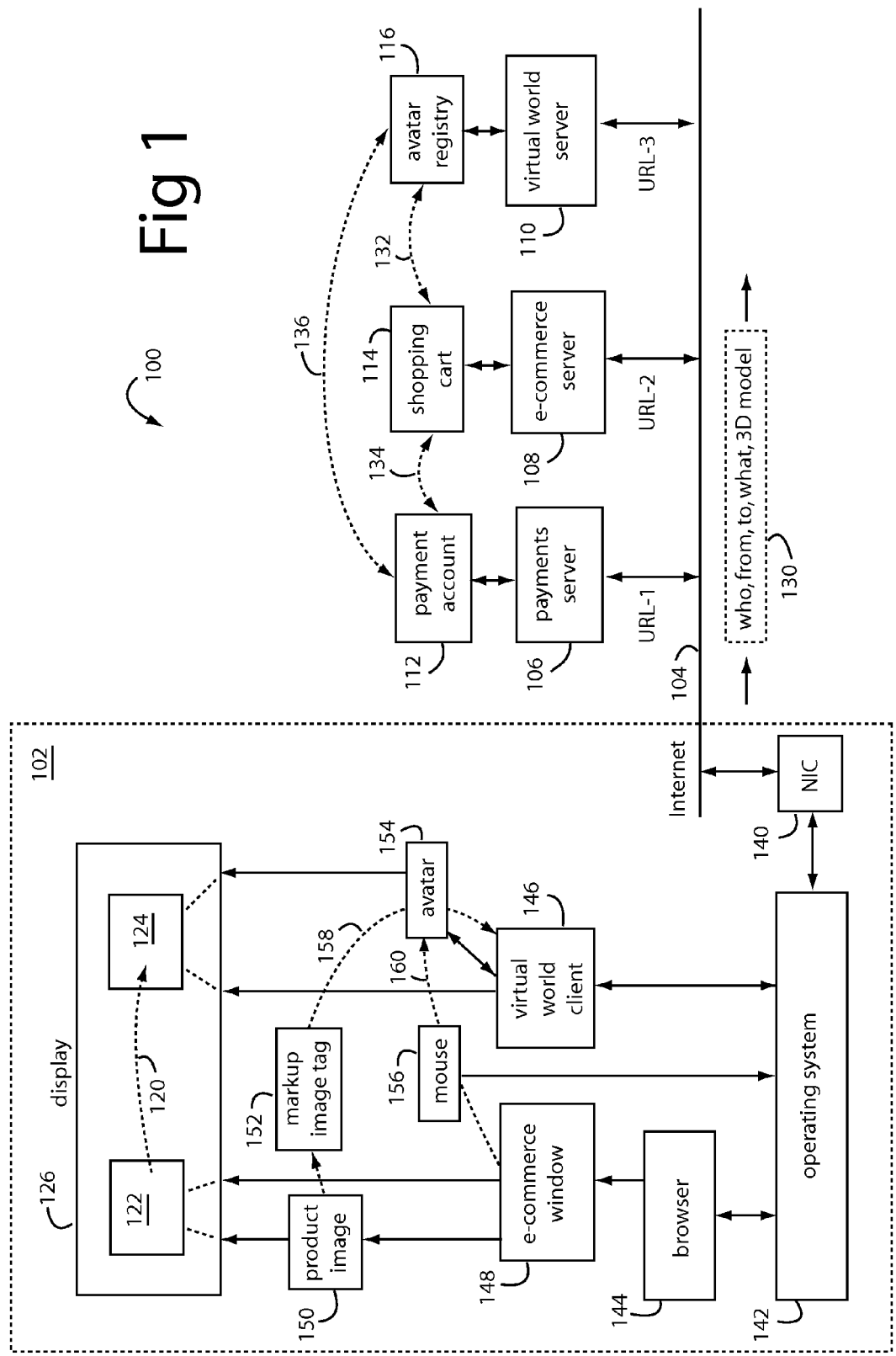
FIG. 1 is a functional block diagram showing an interoperable system in accordance with the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one general embodiment, a machine automation for enabling users to acquire products by dragging a product image icon off of an e-commerce web page and on to a virtual world client comprises at least one product image icon disposed in seller web page for display in a browser window and representing a product that is offered for a buyer from a seller; an image tag associated with each product image icon and including information related to a unique identifier, such as a virtual world client providing for a virtual world window to be presented on a user display screen together with the browser window; and a drag-and-drop application program for interpreting a user action with a mouse, touch screen, pen, track ball or other pointing device that can be used to drag product image icons from the browser window on to a virtual world client window as a request to obtain corresponding products, and for passing the respective image tags to an underlying operation system in communication with a network and a virtual world network server. Wherein, the virtual world network server is configured to receive the respective image tags and graphically render the products they represent in a virtual world occupied by an avatar controlled by the buyer.

In another general embodiment, a method for using a computer to obtain products by dragging a product image icon off of an e-commerce web page and on to a virtual world client comprises displaying at least one product image icon in seller web page in a browser window to represent a virtual or real product that is offered for sale to a buyer from a seller; associating an image tag with each product image icon and including information related to a unique identifier, such as a stock keeping unit (SKU) or universal product code (UPC), buyer credentials, and seller identification; using a virtual world client to provide a virtual world window on a user display screen together with the browser window; and interpreting a user action with a drag-and-drop application program that drags product image icons from the browser window on to a virtual world client window as a request to obtain corresponding the virtual or real products, and for passing the respective image tags to an underlying operation system in communication with a network and a virtual world network server. Wherein, the virtual world network server can receive the respective image tags and graphically render the products they represent in a virtual world occupied by an avatar controlled by the buyer.

In another general embodiment, a computer program product comprises a computer usable medium having computer usable program code embodied therewith, the computer usable program code configured to obtain products by dragging a product image icon off of an e-commerce web page and on to a virtual world client. The computer usable program code comprises computer usable program code configured to display at least one product image icon in seller web page in a browser window to represent a virtual or real product that is offered for sale to a buyer from a seller; computer usable program code configured to associate an image tag with each product image icon and include information related to a unique identifier, such as a stock keeping unit (SKU) or universal product code (UPC), buyer credentials, and seller identification; computer usable program code configured to use a virtual world client to provide a virtual world window on a user display screen together with the browser window; and computer usable program code configured to interpret a user action with a drag-and-drop application program that drags product image icons from the browser window on to a virtual world client window as a request to obtain corresponding virtual or real products, and for passing the respective image tags to an underlying operation system in communication with a network and a virtual world network server. Wherein, the virtual world network server can receive the respective image tags and graphically render the products they represent in a virtual world occupied by an avatar controlled by the buyer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, wherein like reference numerals indicate like components, there is illustrated an exemplary interoperable system 100. In one general embodiment, a machine 102 is connected to communicate over the Internet 104 with a payments network server 106, an e-commerce network server 108, and a virtual world network server 110. As defined herein, a "machine" may comprise any device suitable for communicating with a server 106 via suitable means, such as the Internet 104. For example, the machine 102 may comprise a desktop or laptop computer, or a tablet-type device, or other such mobile device capable of connecting to the server 106. Further, the machine 102 may connect to the server 106 via any known or suitable means. The machine 102 may connect to the server 106, via the Internet for example, either wirelessly or wire based. In one embodiment, the machine comprises a desktop computer 102 that is connected to communicate over the Internet 104 with the payments network server 106, an e-commerce network server 108, and the virtual world network server 110.

Each network server has its own uniform resource locator (URL), e.g., URL-1, URL-2, and URL-3. The payments network server 106 maintains a payment account 112 for particular users. The e-commerce network server 108 maintains a shopping cart 114 for the users that visit their web site, and virtual world network server 110 maintains an avatar registry 116 for its residents. Here, the user operating the personal computer 102 is the one who has a matching payment account 112, shopping cart 114, and avatar registry 116. Each of the payments network server 106, e-commerce network server 108, and virtual world network server 110 operate independently until the user of personal computer 102 performs a drag and drop 120 action between an open desktop browser window 122 and a virtual client or "drop" window 124 on a user touchscreen and/or display 126. Such drag-and-drop action 120 generates a datapacket 130 on the Internet 104 that provides information about the user, the product, the product source, the delivery site, and a prim for virtual representations of the product.

As is known in the art, in virtual reality applications and other three-dimensional applications, "primitives" or "prims" comprise basic geometric shapes and forms. These shapes and forms may include spheres, cubes, boxes, toroids, cylinders, and pyramids among other well known shapes and forms. Prims are considered to be primitives in 3D modeling and virtual reality applications and other three-dimensional applications, because they are the building blocks for many other shapes and forms in the application. Herein, a prim may be used to represent virtual representations of the product, such as a three dimensional product image.

The datapacket 130 is received from the Internet 104 by the network server supporting the drop window 124 supported by the virtual worlds network server 110. Back-channels 132, 134, and 136, and the server clients coordinate the acquisition and/or purchase of the product between payment account 112, shopping cart 114, and avatar registry 116.

The personal computer 102 includes a network interface controller (NIC) 140 for connection to the Internet 104. In one embodiment, the NIC 140 may comprise a wireless implementation with intervening routers, gateways, and transceivers, as is known in the art. The personal computer 102 further includes an operating system 142 to provide basic systems services and support for program applications such as an Internet browser 144 and a virtual world client 146, among other applications (not shown).

In the Figure, an e-commerce window 148 is opened in the user display 126. The e-commerce window 148 includes a product image icon 150 described by a markup image tag 152. The virtual world client 146 supports the drop window 124 and an avatar 154. The drag-and-drop action 120 is instigated to cause a transfer 158 of markup image tag 152 information to the virtual world client 146. In one embodiment, the drag-and-drop action 120 is instigated using a pointing device 156.

In one general embodiment, the pointing device 156 may comprise any suitable device or means for instigating a drag-and-drop action 120. For example, a pointing device 156 may comprise a known mouse or a pen type pointing device. Similarly, the pointing device 156 may comprise a finger pad or touch based pointing device, such as a touch pad commonly found on lap top computers, where a user physically touches the finger pad or touch-pad to position a pointer on the user display 126. The pointing device 156 may comprise any suitable device capable of motion sensitive detection for instigating a drag-and-drop action 120. In one general embodiment, the pointing device 156 may comprise a known mouse to instigate a drag-and-drop action 120.

The transfer 158 of markup image tag 152 information to the virtual world client 146 generates datapacket 130 which is sent to the virtual world's network server 110. Additional information 160 may be fetched from e-commerce window 148 to help construct datapacket 130.

In general, when an inventory item is added to an e-commerce web site, that item's markup image tag includes a prim or a pointer to a set of prims that is recognizable and useable by virtual world clients. Extra attribute tags further include information about where the virtual source for the item can be obtained, a generic description, a detailed description, a price (if any), and who is to receive payment in real or virtual money. Table-I represents an exemplary implementation of mark up image tag 152.

TABLE I

```
<img src="chair.gif" alt="A wooden chair"
    virtual_src="www.example.com/chairs/shaker_chair123.x3d"
        virtual_type="furniture.chair"
    virtual_price="$L0.00@sears_roebuck147756" />
```

It is therefore desirable for there to be some standardization in the protocols and formats used by interoperable system 100; otherwise, complex and not inexpensive translators and indexes would need to be maintained. Currently most personal computers 102 run existing and known operating systems. So, in one embodiment, a downloadable application program file to implement markup image tag 152, transfer 158, additional information 160, and a device to generate datapacket 130. Such would be responsive to the drag-and-drop action 120. In another embodiment, a network server device to implement back-channels 132, 134, and 136, and a decoder to receive and understand datapacket 130. In a further embodiment, a product image icon 150 that includes markup image tag 152, and that can be sent by e-commerce network server 108 or another virtual world network server similar to network server 110.

The above can be described another way from a slightly different perspective. Referring again to FIG. 1, a machine automation embodiment for installation on personal computer 102 enables users to acquire products by dragging a product image icon 150 off of an e-commerce web page browser window 122 and onto a virtual world client window 124. At least one product image icon 150 is disposed in seller web page for display in a browser window 122, and it represents a product being offered for sale. An image tag 152 is associated with each product image icon and includes information related to a stock keeping unit (SKU) or universal product code (UPC), buyer credentials, and seller identification.

A virtual world client 146 provides for a virtual world window to be presented on a user display screen 126 and to be interoperable with browser window 122. A drag-and-drop application program, included in operating system 142, interprets user actions with a pointing device 156 that drags 120 product image icons from the browser window 122 on to the virtual world client window 124 as a request to obtain corresponding products. The corresponding image tags 152 are passed to operation system 142 in communication with a network 104 and a virtual world network server 110. The virtual world network server 110 is configured to receive the respective image tags and graphically render the products they represent in a virtual world occupied by an avatar 154 controlled by the buyer. In a typical implementation this would be coded as modules of the virtual world client that would interpret a message sent by the browser and conveyed by the operating system.

E-commerce network server 108 includes a price checking application program for fetching the prices of corresponding products according to a unique identifier such as a SKU or UPC, and asks for authorization from the buyer to complete a purchase transaction. The image tag and its buyer credentials, and seller identification are distilled into datapackets 130 and are such to enable virtual world network server 108 to query payments network server 106 for authorization to complete a financial transaction involving the purchase of the corresponding virtual or real product. The machine used for this could be a desktop or laptop computer, or a tablet-type device, and that the machines may connect to a server, for example, either wirelessly or wire based. The virtual world network server 110 addresses the seller web page and payments network server 106 over network 104 by their respective Uniform Resource Locators (URL). The virtual world client 146 and virtual world network server 110 uses product models or prims to analyze what the product image icon 150 represents and how it should be graphically rendered.

A graphic rendering application program, disposed in either of the virtual world client 146 and virtual world network server 110, graphically renders an object represented by the product image icon 150 in at least one of the following ways: to replace the current user's avatar 154, to put on clothing, to move the user's avatar 154 into a vehicle being purchased, to place a building next to the user's avatar 154 current location, or to place general items in an avatar inventory.

Figure 2:
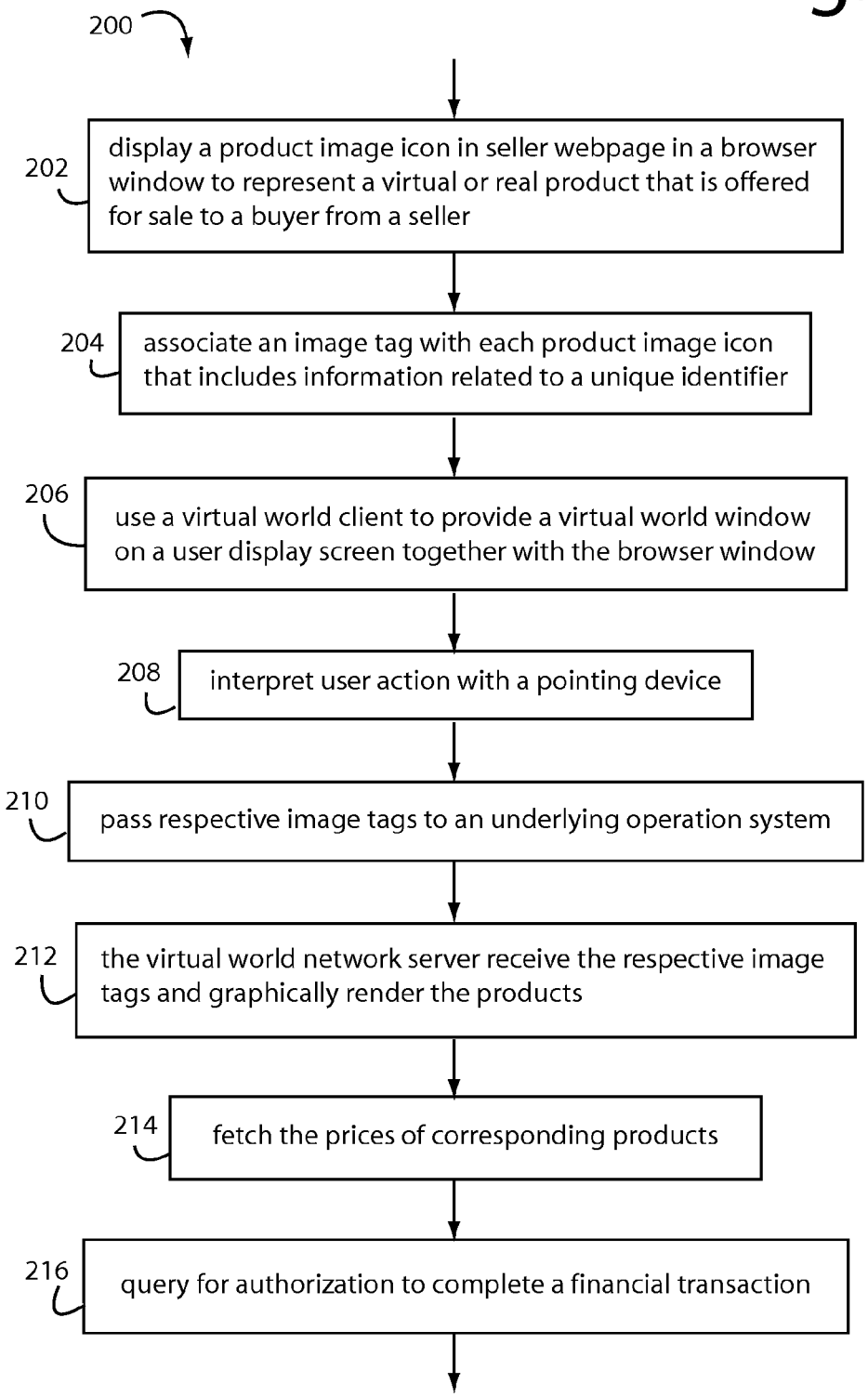
FIG. 2 is a flowchart diagram showing an interoperable system in accordance with the invention.

Referring to FIG. 2 of the drawings, there is shown a method 200 for using a computer to buy products by dragging a product image icon off of an e-commerce web page and on to a virtual world client comprises displaying, in a step 202 at least one product image icon in seller web page in a browser window to represent a virtual or real product that is offered for sale to a buyer from a seller. An image tag is associated with each product image icon, in a step 204, and includes information related to a unique identifier such as a stock keeping unit (SKU) or universal product code (UPC), buyer credentials, and seller identification. A virtual world client is used, in a step 206, to provide a virtual world window on a user display screen together with the browser window.

A user action with a pointing device, in a step 208, is interpreted with a drag-and-drop application program that drags product image icons from the browser window on to a virtual world client window as a request to obtain the corresponding virtual or real products, and, in a step 210, for passing the respective image tags to an underlying operation system in communication with a network and a virtual world network server. In a step 212, the virtual world network server can thereby receive the respective image tags and graphically render the products they represent in a virtual world occupied by an avatar controlled by the buyer.

Such method can further include a step 214 for fetching the prices of corresponding products according to the SKU or UPC, and for obtaining authorization from the buyer to complete a purchase transaction. It can also use the image tag and its buyer credentials and seller identification so the virtual world network server can query a payments network server in a step 216 for authorization to complete a financial transaction involving the purchase of the corresponding virtual or real product. The addressing of the seller web page and the payments network server from the virtual world network server over a network is done using their respective uniform Resource Locators (URL). Product models are used in the virtual world client and/or virtual world network server to analyze what the product image icon represents and how it should be graphically rendered. The graphically rendering of objects represented by the product image icons is done in at least one of the following ways: to replace the current user's avatar, to put on clothing, to move the user's avatar into a vehicle being purchased, to place a building next to the user's current location, or to place general items on the ground next to the user's avatar.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A system comprising:
a computer operative to receive user input and execute computer usable program code;
a network interface coupling the computer to a network;
at least one product image icon disposed in a seller web page operated by a party for display in a browser window of a browser client displayed on a user display screen of the computer, each product image icon representing a product that is offered for sale;
an image tag associated with each product image icon, the image tag including information related to a unique identifier;
a virtual world client providing for a virtual world window for a virtual world operated by a different party than the party operating the seller web page to be presented on the user display screen together with the browser window; and
a drag-and-drop application program separate from the virtual world client and from the browser client for interpreting a user action that drags product image icons from the browser window on to a virtual world client window as a request to obtain corresponding virtual or real products and for passing the respective image tags to an underlying operation system in communication with a virtual world network server over the network;
wherein, the virtual world network server receives the respective image tags and graphically renders the products they represent in the virtual world occupied by an avatar controlled by a buyer;
wherein the drag-and-drop application program permits the at least one product image icon disposed in the seller web page to be employed within the virtual world client where the virtual world is separate from the seller web page and the virtual world is operated by the different party than the party operating the seller web page.

2. The system of claim 1, further comprising:
a price checking application program for fetching the prices of corresponding products, and for obtaining authorization from the buyer to complete a purchase transaction.

3. The system of claim 1, further comprising:
each image tag further comprising:
buyer credentials and seller identification, the buyer credentials and seller identification enabling the virtual world network server to call a payments network server for authorization to complete a financial transaction involving the purchase of the corresponding virtual or real product.

4. The system of claim 1, wherein:
the virtual world network server addresses the seller web page and the payments network server over a network by their respective Uniform Resource Locators (URL).

5. The system of claim 1, wherein:
the virtual world client and virtual world network server utilizing product models for analyzing what the product image icon represents and how it is to be graphically rendered.

6. The system of claim 5, further comprising:
a graphic rendering application program running on one of the virtual world client and virtual world network server, the graphic rendering application graphically rendering an object represented by the product image icon in at least one of the following methods: to replace the current user's avatar, to put on clothing, to move the user's avatar into a vehicle being purchased, to place a building next to the user's current location, and to place general items in the user's avatar inventory.

7. A method comprising:

displaying at least one product image icon in a seller web page operable by a party in a browser window of a browser client displayed on a user display screen of a computer, the at least one product image icon representing at least one of a virtual product and a real product that is offered for sale;

associating an image tag with each product image icon including information related to a unique identifier;

providing displaying a virtual world window for a virtual world operated by a different party than the party operating the seller web page on the user display screen together with the browser window by means of a virtual world client; and interpreting a user action performed on the computer with a drag-and-drop application program separate from the virtual world client and from the browser client that drags product image icons from the browser window on to a virtual world client window displayed on the user display screen as a request to obtain corresponding virtual or real products, and for passing the respective image tags to an underlying operation system in communication with a network and a virtual world network server;

wherein, the virtual world network server receives the image tags and graphically render the products they represent in the virtual world occupied by an avatar controlled by a buyer;

wherein the drag-and-drop application program permits the at least one product image icon displayed in the seller web page to be employed within the virtual world client where the virtual world is separate from the seller web page and the virtual world is operated by the different party than the party operating the seller web page.

8. The method of claim 7, further comprising:

fetching prices of corresponding products according to at least one of a SKU code and a UPC code, and for obtaining authorization from the buyer to complete a purchase transaction.

9. The method of claim 7, further comprising:

each image tag further comprising buyer credentials and seller identification, and using each image tag so the virtual world network server can call a payments network server for authorization to complete a financial transaction involving the purchase of the corresponding virtual or real product.

10. The method of claim 9, further comprising:

addressing the seller web page and the payments network server from the virtual world network server over a network by their respective Uniform Resource Locators (URL).

11. The method of claim 7, further comprising:

using product models in the virtual world client and virtual world network server to analyze what the product image icon represents and how it is to be graphically rendered.

12. The method claim 11, further comprising:

graphically rendering objects represented by the product image icons in at least one of the following methods: to replace the current user's avatar, to put on clothing, to move the user's avatar into a vehicle being purchased, to place a building next to the user's current location, and to place general items into the user's avatar inventory.

13. A computer program product comprising:

a non-transitory computer readable medium storing computer usable program code, the computer usable program code comprising:

computer usable program code configured to obtain products by dragging a product image icon off of an e-commerce web page and on to a virtual world client, the computer usable program code comprising:

computer usable program code configured to display at least one product image icon in a seller web page operated by a party in a browser window of a browser client to represent a virtual or real product that is offered for sale to a buyer from a seller;

computer usable program code configured to associate an image tag with each product image icon and include information related to a unique identifier;

computer usable program code configured to use a virtual world client to provide a virtual world window for a virtual world operated by a different party than the party operating the seller web page on a user display screen together with the browser window; and computer usable program code configured to interpret a user action with a drag-and-drop application program separate from the virtual world client and from the browser client that drags product image icons from the browser window on to a virtual world client window as a request to obtain corresponding virtual or real products, and for passing the respective image tags to an underlying operation system in communication with a network and a virtual world network server;

wherein, the virtual world network server receives the respective image tags and graphically renders the products they represent in the virtual world occupied by an avatar controlled by the buyer;

wherein the drag-and-drop application program permits the at least one product image icon disposed in the seller web page to be employed within the virtual world client where the virtual world is separate from the seller web page and the virtual world is operated by the different party than the party operating the seller web page.

14. The computer program product of claim 13, further comprising:

computer usable program code configured to fetch prices of corresponding products according to at least one of a SKU code and a UPC code and to obtain authorization from the buyer to complete a purchase transaction.

15. The computer program product of claim 13, further comprising:

each image tag further comprises buyer credentials and seller identification; and computer usable program code configured to use each image tag and its buyer credentials and seller identification so the virtual world network server can call a payments network server for authorization to complete a financial transaction involving the purchase of the corresponding virtual or real product.

16. The computer program product of claim 15, further comprising:

computer usable program code configured to address the seller web page and the payments network server from the virtual world network server over a network by their respective Uniform Resource Locators (URL).

17. The computer program product of claim 13, further comprising:

computer usable program code configured to use product models in the virtual world client and virtual world network server to analyze what the product image icon represents and how it is to be graphically rendered.

18. The computer program product of claim 17, further comprising:

computer usable program code configured to graphically render objects represented by the product image icons in at least one of the following methods: to replace the current user's avatar, to put on clothing, to move the user's avatar into a vehicle being purchased, to place a building next to the user's current location, and to place general items into the user's avatar inventory.

* * * * *